May 6, 1941. J. T. CARLSON 2,240,980
THERMOMETER SUPPORT
Filed June 1, 1938
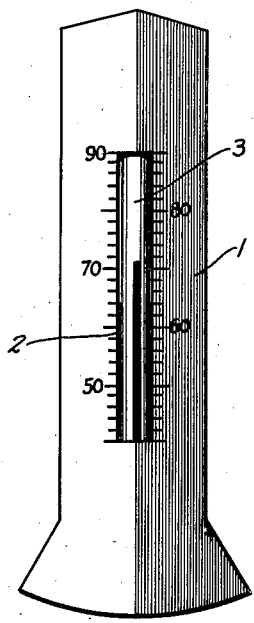
Fig.-1
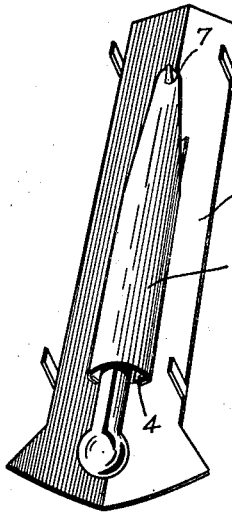
Fig.-2
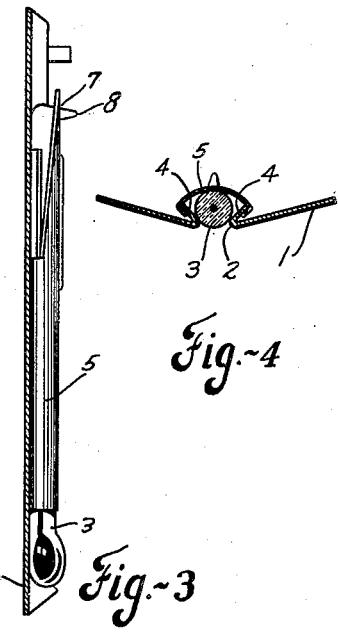
Fig.-3
Fig.-4
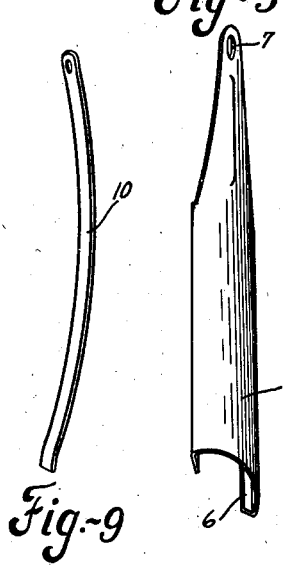
Fig.-5
Fig.-9
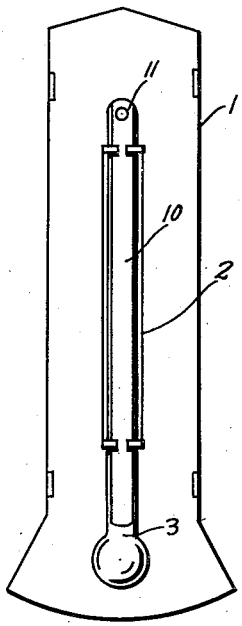
Fig.-6
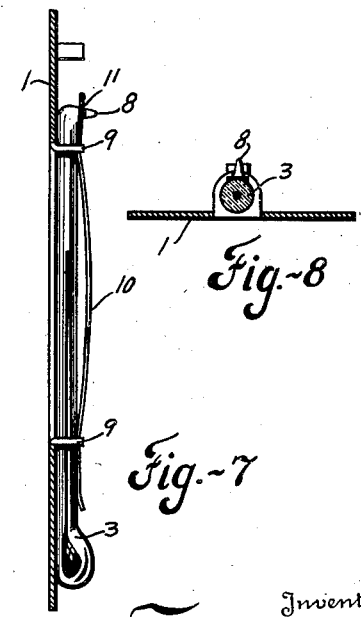
Fig.-7
Fig.-8
Inventor
John T. Carlson
By J. L. Walker
Attorney Patented May 6, 1941

2,240,980

UNITED STATES PATENT OFFICE 2,240,980

THERMOMETER SUPPORT

John T. Carlson, Dayton, Ohio, assignor to The Master Electric Company, Dayton, Ohio, a corporation of Ohio Application June 1, 1938, Serial No. 211,213

11 Claims. (Cl. 73—376)

This invention pertains to measuring instruments and gauges, and more particularly to a means and method of mounting thermometer or barometer tubes, indicator glasses or the like.

In the present disclosure there is contemplated means for adjustably mounting a thermometer or barometer tube, pressure gauge, fluid level indicator or the like for longitudinal adjustment relative to an associated calibrated scale to enable correction of error in the reading of the instrument, or to properly correlate the indicator with the scale, and hold the indicating tube in its adjusted relation.

The object of the invention is to improve the construction as well as the means and mode of operation of such indicator mounts, whereby they may not only be economically manufactured but will be more efficient in use, easily and readily adjustable, adapted to securely hold the indicator tube in its adjusted relation and unlikely to get out of repair.

A further object of the invention is to enable error in the indication of such instrument to be quickly and easily corrected.

A further object of the invention is to provide tensioned means for automatically holding the indicator tube in its adjusted relation.

A further object of the invention is to provide an indicator tube mount wherein the indicator tube will be protected against injury and breakage.

A further object of the invention is to provide an instrument mount having the herein mentioned structural features and meritorious characteristics.

With the above primary and other incidental objects in view as will more fully appear in the specification, the invention intended to be protected by letters patent consists of the features of construction, the parts and combinations thereof, and the mode of operation or their equivalents, as hereinafter described or illustrated in the accompanying drawing.

In the drawing wherein are shown the preferred but obviously not necessarily the only form of embodiment of the invention, Fig. 1 is a front elevation of the herein described mount and an indicator tube therein.

Fig. 2 is a perspective view of the rear side of the mount forming the subject matter hereof with a thermometer tube therein.

Fig. 3 is a longitudinal sectional view.

Fig. 4 is a transverse sectional view.

Fig. 5 is a perspective view of the carrier slide removed from the mount.

Fig. 6 is a rear view of a modified embodiment of the mount with a thermometer tube supported therein.

Fig. 7 is a longitudinal sectional view thereof.

Fig. 8 is a transverse sectional view.

Fig. 9 is a perspective view of the tensioned slide detached from the mount.

Like parts are indicated by similar characters of reference throughout the several views.

While the invention is herein shown and described as applied to a thermometer tube mounting, it is to be understood that it is equally applicable to a barometer, pressure or water gauge, or analogous devices.

Referring to the accompanying drawing, 1 is a graduated scale plate which, for appearance, is of concavo-convex form, but which may be of any desirable form or marginal contour. Likewise, the proportions may be varied according to the type of indicator. The shape and size are not essential.

The gauge plate 1 is longitudinally slotted at 2 to expose through the opening an indicator tube 3. The margins of the observation slot 2 are bent rearwardly and outwardly to form guide flanges or ways 4.

Slidingly engaging the guide flanges 4 is a carrier slide or clip 5 of spring material of shallow channel form, the longitudinal edges of which are inturned, forming flanges 6 which overlap the mount flanges 4 under tension. The channel shaped slide 5 when engaged with the mount is under sufficient inherent tension to grip the flanges with sufficient friction to maintain the slide securely in adjusted relation. At its upper end the slide is provided with a hole 7.

In sealing off the end of a thermometer tube after "heating out" the indicating fluid, there is customarily formed a laterally projecting teat or sprue 8. Such sprue 8 in the present instance is utilized to engage the tube with the slide 5. The indicator tube 3 with its sprue 8 engaging in the hole 7 of the slide is positioned between the slide and the scale plate 1 coincident with the slot 2 through which the indicating fluid within the tube is visible. By slidingly adjusting the carrier 5 and the interconnected indicator tube the level of the indicating fluid therein can be brought into conformity with the corresponding graduation of the scale. Such adjustment enables compensation of the instrument for unusual conditions or for changes of operating conditions.

In lieu of the outwardly flanging longitudinal margins 4 of the observation slot 2, the material removed from the ends of the slot may be turned rearwardly as apertured ears 9 to receive the indicator tube 3 which is thrust therethrough. Also thrust through the tube openings in the supporting ears 9 alongside the tube is a tension spring 10. The spring has in its upper end a hole 11 to receive the sprue or teat 8 of the indicator tube in the same manner as the tube is engaged with the slide 5. The spring 10 is under sufficient tension when so engaged to exert ample frictional pressure to maintain the indicator tube in its adjusted relation. The level of the indicating fluid is observable through the slot in the scale plate 1 as shown in Fig. 1. By sliding the tube 3 and spring 10 in unison through the ears or loops 9, the relation of the indicating fluid may be adjusted in relation to the scale of graduations on the plate 1 as before described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a mount for an indicator tube having a lateral projection thereon a slotted scale unit, rearward projecting flanges coincident with the longitudinal margins of the slot, a resilient sliding carrier for the indicator tube having tensioned engagement with the flanges, said carrier having therein a hole in which the projection is adapted to engage, whereby the carrier and the tube may be adjusted in unison relative to the scale unit to present the indicating fluid level of the tube in registry with a selected graduation on the scale.

2. A mount for an indicator tube, including a slotted unit bearing a series of graduations through the slot of which indicating fluid in the tube is visible, spaced projections extending rearwardly from said unit, and a spring carrier member for the tube having sliding relation with the projections on said unit for placing said spring carrier member under tension for yieldingly maintaining the tube in its adjusted relation.

3. A mount for an indicator tube, including a slotted scale unit, in registry with the slot of which an indicator tube is positioned, rearwardly extending flanges on said unit and a resilient carrier member having sliding engagement with the rearwardly projecting flanges of the scale unit and with which the indicator tube is engaged for unison adjustment, the tube being visible in different positions of adjustment through the slot in the unit.

4. In a mount for an indicator tube, a slotted unit bearing a series of graduations adjacent the slot thereof, and parallel rearwardly extending flanges contiguous to the longitudinal margins of the slot and a mount for an indicator tube upon which the tube is supported for movement relative to the slotted unit and having interlocking frictional sliding engagement with said rearwardly extending flanges.

5. In a mount for an indicator tube a slotted unit bearing a series of graduations adjacent the slot thereof and rearwardly projecting apertured guide means contiguous to the ends of the slot and a tube engaging member having frictional sliding engagement within the apertures of said rearwardly projecting guide means.

6. In a mount for an indicator tube a slotted unit bearing a series of graduations adjacent the slot thereof, in relation with which an indicator tube observable through the slot is slidingly adjustable, and a spring member cooperating with means on said unit for yieldingly maintaining the tube in its adjusted relation with the unit.

7. In a mount for an indicator tube, a slotted unit bearing a series of graduations adjacent the slot thereof, a resilient carrier for an indicator tube and guide means upon the rear side of the unit with which the carrier is engaged under tension for sliding adjustment to expose the tube through the slot in adjusted relation with the graduations.

8. In a mount for an indicator tube, a slotted unit bearing a series of graduations adjacent the slot thereof, guide flanges formed by rearwardly and outwardly turning the longitudinal margins of the slot, a channelled slide with which an indicator tube is engageable, inturned marginal flanges thereon slidingly engaging the guide flanges of the unit under inherent spring tension of the slide to retain the tube in adjusted relation with the unit for observation through the slot thereof.

9. In a mount for an indicator tube, a slotted unit bearing a series of graduations adjacent the slot thereof, guide flanges on the rear side of the unit parallel to the slot, and a slide with which an indicator tube is engageable, having sliding engagemnt with the guide flanges at least one of the interengaging members possessing sufficient resiliency to frictionally retain the slide in adjusted relation with the unit for observation through the slot thereof.

10. In a mount for an indicator tube, a slotted unit bearing a series of graduations adjacent the slot thereof, recessed guide flanges on the rear side of the unit contiguous to the ends of the slot within which an indicator tube is slidingly engageable, and a spring member having engagement with the guide flanges to retain the tube in adjusted relation with the unit for observation through the slot thereof.

11. A mount for an indicator tube including a graduated scale unit, in relation with which an indicator tube is adjustably mounted for longitudinal movement to correlate the fluid level of the indicator tube with a corresponding graduation on the scale unit, an adjustable carrier providing an elongated clip with which an indicator tube is engageable, said carrier and the graduated scale unit being interengaged for relative sliding adjustment lengthwise of the unit, one of said members being sufficiently resilient to maintain the interengaged members in relatively adjusted relation independent of other fastening means.

JOHN T. CARLSON.